(12) United States Patent
Galler et al.

(10) Patent No.: US 11,284,965 B1
(45) Date of Patent: Mar. 29, 2022

(54) INTERPROXIMAL REDUCTION TOOL AND METHOD

(71) Applicants: David Galler, Woodmere, NY (US); David Ostreicher, Oyster Bay Cove, NY (US)

(72) Inventors: David Galler, Woodmere, NY (US); David Ostreicher, Oyster Bay Cove, NY (US)

( * ) Notice: Subject to any disclaimer, the term of this patent is extended or adjusted under 35 U.S.C. 154(b) by 0 days.

(21) Appl. No.: 17/089,080

(22) Filed: Nov. 4, 2020

(51) Int. Cl.
*A61C 1/06* (2006.01)
*A61C 1/08* (2006.01)
*A61C 1/14* (2006.01)

(52) U.S. Cl.
CPC ............... *A61C 1/06* (2013.01); *A61C 1/082* (2013.01); *A61C 1/145* (2013.01)

(58) Field of Classification Search
CPC .... A61C 3/06; A61C 3/12; A61C 3/00; A61C 3/02; A61C 1/06; A61C 1/081; A61C 1/082; A61C 1/145; A61C 1/185
See application file for complete search history.

(56) References Cited

U.S. PATENT DOCUMENTS

| | | | | |
|---|---|---|---|---|
| 2,842,844 A | * | 7/1958 | Seal | A61C 3/06 433/166 |
| 3,624,908 A | * | 12/1971 | Ricketts et al. | A61C 3/06 433/118 |
| 4,738,621 A | * | 4/1988 | Lowder | A61C 3/06 433/142 |
| 4,988,294 A | * | 1/1991 | DuBe | A61C 3/06 433/134 |
| 5,569,034 A | * | 10/1996 | Meller | A61C 1/185 433/105 |
| 5,975,900 A | * | 11/1999 | Garman | A61C 1/185 433/105 |

(Continued)

FOREIGN PATENT DOCUMENTS

EP         3091971 A1 * 11/2016   ....... G01N 33/57484

OTHER PUBLICATIONS

Bhambri E, Kalra JP, Ahuja S, Bhambri G. Evaluation of enamel surfaces following interproximal reduction and polishing with different methods: A scanning electron microscope study. Indian J Dent Sci 2017;9:153-9. (Year: 2017).*

(Continued)

*Primary Examiner* — Jacqueline T Johanas
*Assistant Examiner* — Shannel Nicole Belk
(74) *Attorney, Agent, or Firm* — Barnes & Thornburg LLP

(57) ABSTRACT

An interproximal reduction tool and method preferably includes at least one polishing strip; at least one abrasive wheel; and a low speed and high torque dental electric motor. First, the area between two adjacent teeth is manually polished with the a plurality of polishing strips. The polishing strip is held between a forefinger and thumb and moved in a horizontal plane. Each abrasive wheel preferably includes an abrasive disc and a shaft. The abrasive disc includes a disc base and abrasive material. The abrasive material is adhered to opposing sides of the disc base. It is preferable to have an annular space between an outer edge of the disc base and an outer perimeter of the annular abrasive material. The low speed/high torque motor preferably utilizes an existing dental motor and modifies the dental motor to have a preferable gear reduction of at least 16:1.

11 Claims, 6 Drawing Sheets

(56) References Cited

U.S. PATENT DOCUMENTS

| | | | | |
|---|---|---|---|---|
| 6,093,084 | A * | 7/2000 | Jefferies | A61C 15/041 |
| | | | | 451/37 |
| 6,217,330 | B1 * | 4/2001 | Danger | A61C 3/06 |
| | | | | 433/166 |
| 2005/0058963 | A1 * | 3/2005 | Stockstill | A61C 3/06 |
| | | | | 433/166 |
| 2006/0019218 | A1 * | 1/2006 | Kuo | A61C 3/06 |
| | | | | 433/166 |
| 2007/0042319 | A1 * | 2/2007 | Florman | A61C 3/06 |
| | | | | 433/116 |
| 2011/0256504 | A1 * | 10/2011 | Rudman | A61C 3/06 |
| | | | | 433/166 |
| 2015/0037753 | A1 * | 2/2015 | Kim | A61C 3/06 |
| | | | | 433/116 |
| 2017/0172705 | A1 * | 6/2017 | Goldbecher | A61C 15/00 |
| 2019/0099246 | A1 * | 4/2019 | Lindeman | A61C 17/24 |

OTHER PUBLICATIONS

Sawai, M.A., et al., "Tooth polishing: The current status", J. Indian Soc. Periodontol. (Jul.-Aug. 2015), vol. 19, No. 4, pp. 375-380.
Womack, R., "The master's guide to interproximal reduction (IPR)", https://orthopracticeus.com/the-master-s-guide-to-interproximal-reduction-ipr/ (Accessed Jun. 15, 2021).
Office action for U.S. Appl. No. 17/097,656, dated Apr. 2, 2021.
Office action for U.S. Appl. No. 17/097,656, dated Jan. 13, 2021.

* cited by examiner

INTERPROXIMAL REDUCTION TOOL AND METHOD

BACKGROUND OF THE INVENTION

1. Field of the Invention

The present invention relates generally to dentistry and more specifically to an interproximal reduction tool and method, which enables a space to be created between adjacent teeth that are in contact with each other.

2. Discussion of the Prior Art

Interproximal reduction is a procedure used in Orthodontics to create a space between two adjacent teeth to allow for Orthodontic Movement between the two adjacent teeth. Creation of a space between two adjacent teeth has traditionally been done with burs, regular discs or finishing strips. Each of these methods creates various problems. Further, space created between two adjacent teeth needs to be estimated by eye or by using a separate metal gauge known as the Womack Gauge. (https://orthopracticeus.com/the-master-s-guide-to-interproximal-reduction-ipr/). The above procedure is time consuming and very inexact.

Patent publication no. 2006/0019218 to Kuo discloses a combined interproximal reduction (IPR) Disc/Measurement Tool. The Kuo tool has the disadvantage of having the abrasive material all the way to an edge of the disc. Having abrasive material on the edge of the material will frequently result in an unwanted gouged out area between the teeth.

Accordingly, there is a clearly felt need in the art for an interproximal reduction tool and method, which greatly reduces the risk of creating a gouged out area between the teeth, when trying to form a space between two adjacent teeth that are in contact with each other.

SUMMARY OF THE INVENTION

The present invention provides an interproximal reduction tool and method, which greatly reduces the risk creating a gouged out area between two adjacent teeth. The interproximal reduction tool and method preferably includes at least one polishing strip; at least one abrasive wheel; and a low speed and high torque dental electric motor. First, the area between two adjacent teeth is manually polished with a plurality of polishing strips to create a 0.09 mm space between the two adjacent teeth. A preferred polishing strip is sold under the name of Qwik Strips. The polishing strips come in increasing values of thickness. The polishing strips have single sided grit and come in yellow, red, blue, green and black sizes. The polishing strip is held between a forefinger and thumb. The polishing strip is moved in a horizontal plane, until a 0.09 mm space is created between two adjacent teeth. However, other types of dental abrasive strips may also be used.

Each abrasive wheel preferably includes an abrasive disc and a shaft. The abrasive wheel is mounted to one end of the shaft. However, an abrasive wheel could be secured to an end of a motor shaft. The abrasive wheel includes a disc base and abrasive material. The abrasive material is adhered to opposing sides of the disc base. An annular shape of abrasive material is formed on opposing sides of the disc base. It is preferable to have an annular space between an outer edge of the disc base and an outer perimeter of the annular abrasive material to prevent gouging to adjacent teeth. It is critical to prevent the abrasive disc from "end cutting," which can cut into the enamel of a tooth instead of just reducing the outside layer of the tooth on the interproximal surface. The annular space on the abrasive disc prevents the "end cutting" of the tooth. It is preferable to have a second annular space without abrasive between an inside perimeter of the abrasive material and the shaft. The second annular space prevents accidental destruction of the adjacent tooth.

The abrasive discs preferably come in a thickness of yellow (0.15 mm) red (0.20 mm) blue (0.30 mm), green (0.40 mm) and black (0.50). It is preferable that the grit be sourced from Strauss Diamond. The low speed/high torque motor preferably utilizes an existing dental motor, such as a Marathon III micro motor, and modifies the dental motor to have a preferable gear reduction of 16:1 to reduce speed by 1/16 and increase torque 16 times. The gear reduction results in a slower rotation of the abrasive disc to provide extreme precision; improved tactile control to the dentist; and prevents the disc from getting caught between the two adjacent teeth.

Accordingly, it is an object of the present invention to provide an interproximal reduction tool and method, which greatly reduces the risk of creating "end cutting between two adjacent teeth, when trying to form a space between the two adjacent teeth that are in contact with each other.

It is another object of the present invention to provide an interproximal reduction tool and method, which provides color coordination to alleviate the need for guesstimating by eye or using a Womack gauge to measure a distance between two adjacent teeth.

Finally, it is object of the present invention to provide an interproximal reduction tool and method, which includes differing sequential increasing grits of an abrasive disc and thicknesses of polishing strips that provide a practitioner with much better tactile control to provide a more precise space between two adjacent teeth.

These and additional objects, advantages, features and benefits of the present invention will become apparent from the following specification.

DETAILED DESCRIPTION OF THE PREFERRED EMBODIMENTS

Figure 1:
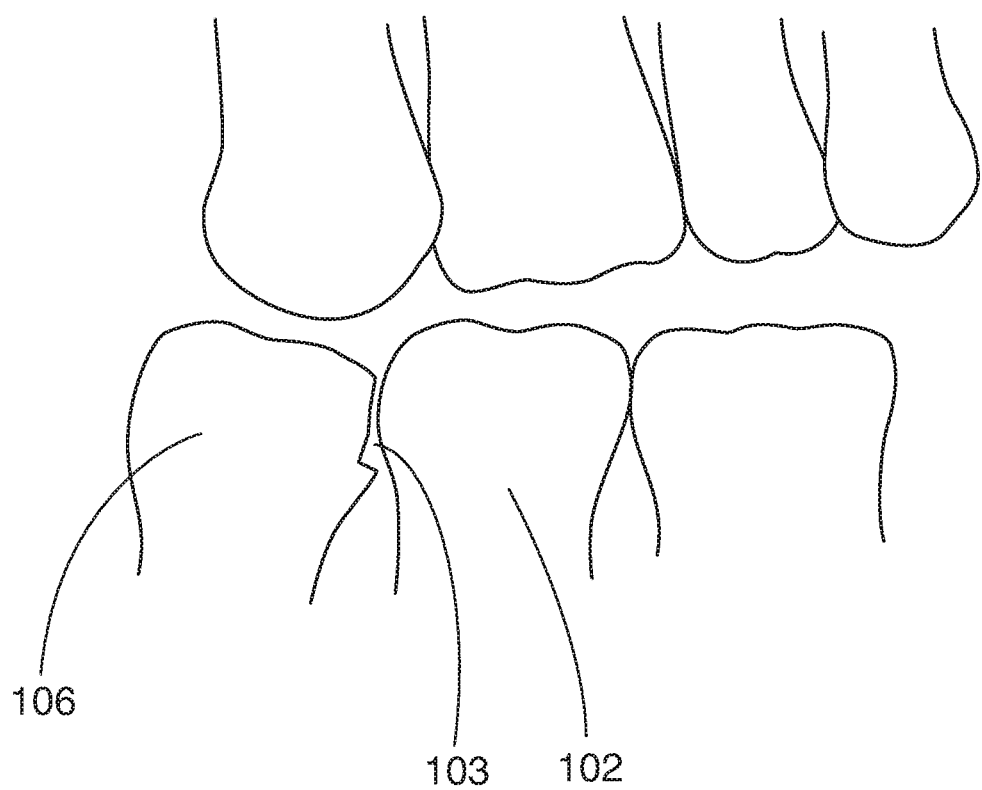
FIG. 1 is a side view of a plurality of teeth where a abrasive disc without an annular ring has been used to create a space between two adjacent teeth.
Figure 2:
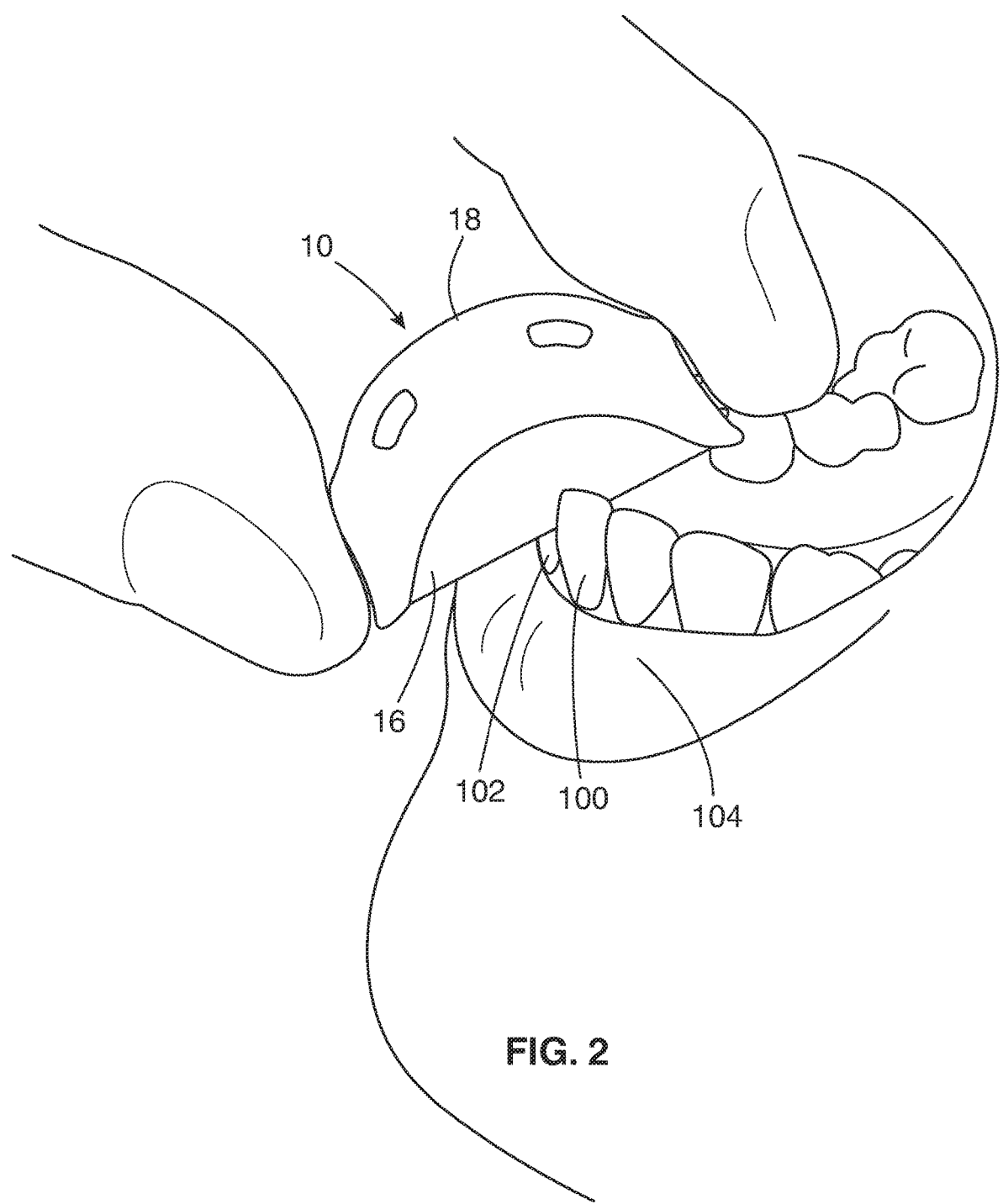
FIG. 2 is a perspective view of a dental abrasive strip being used between two adjacent teeth of an interproximal reduction tool and method in accordance with the present invention.
Figure 3:
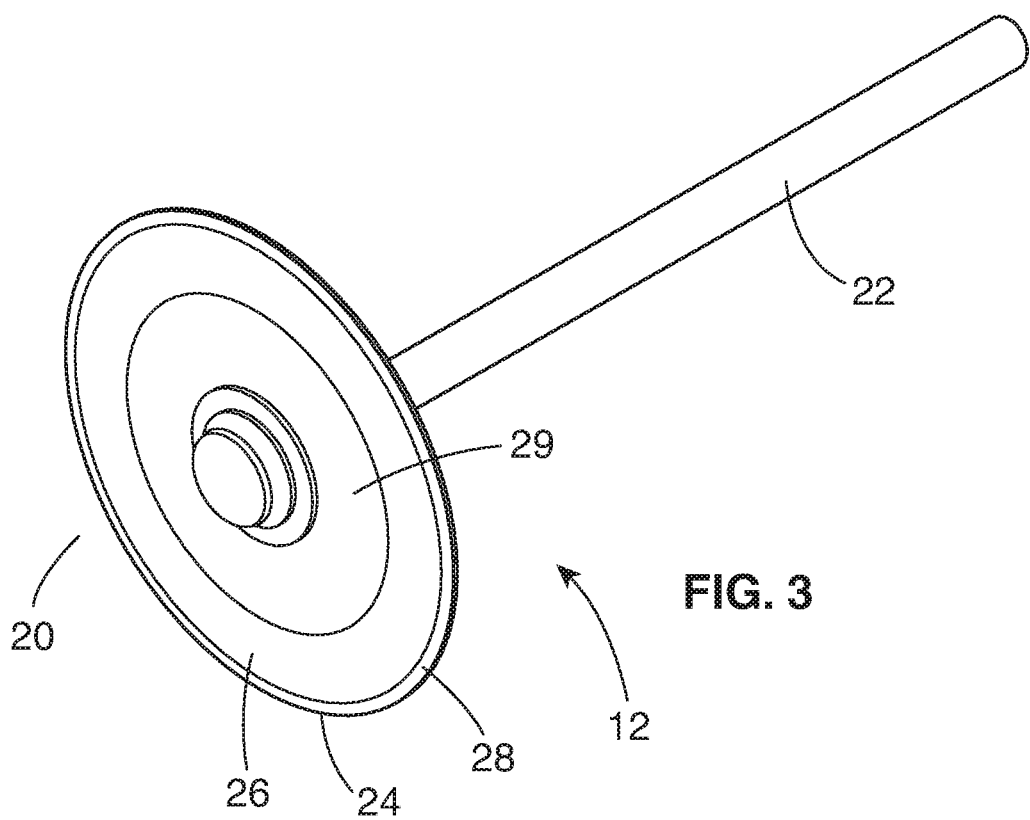
FIG. 3 is a perspective view of a dental abrasive wheel of an interproximal reduction tool and method in accordance with the present invention.
Figure 4:
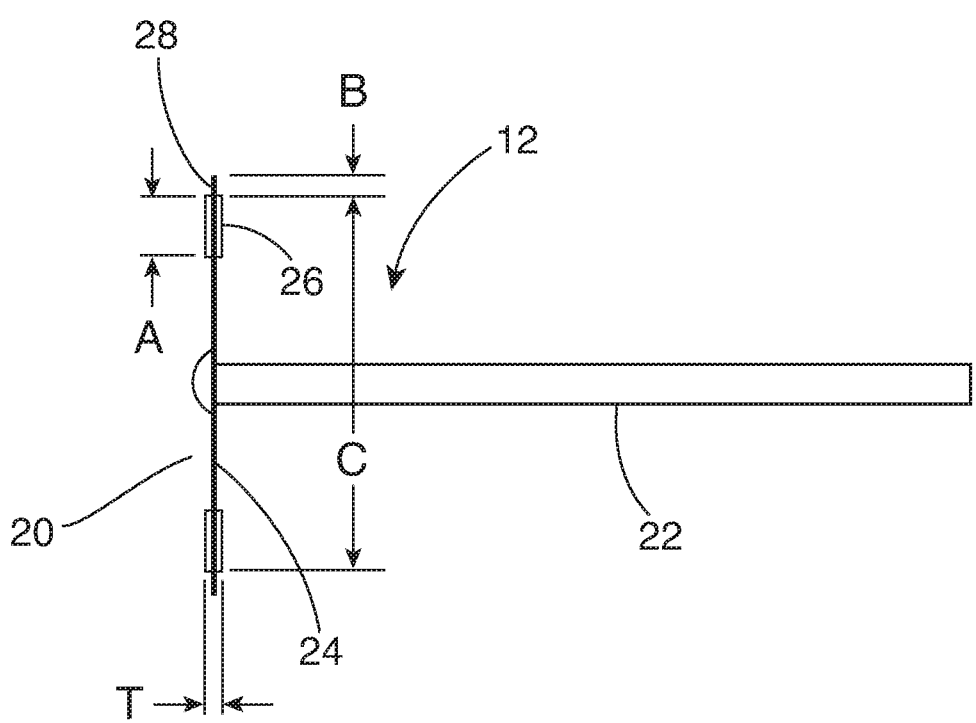
FIG. 4 is a side view of a dental abrasive wheel of an interproximal reduction tool and method in accordance with the present invention.
Figure 5:
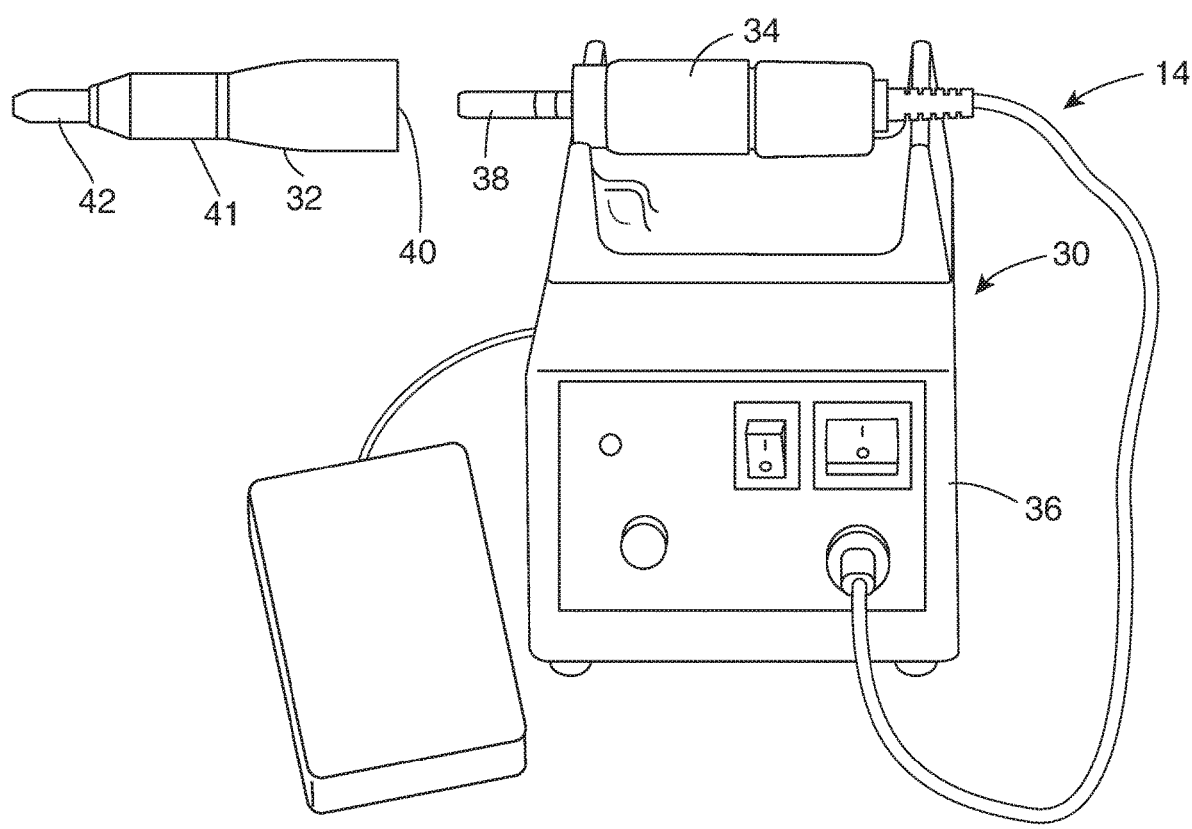
FIG. 5 is a partially exploded perspective view of a dental motor that will be modified with a 16:1 gear reduction gear drive of an interproximal reduction tool and method in accordance with the present invention.

With reference now to the drawings, and particularly to FIG. 2, there is shown a perspective view of a dental polishing strip 10. FIG. 1 illustrates an end cut 103, which created by a prior art abrasive wheel between two adjacent teeth. The end cut 103 removed a significant portion of tooth enamel of the tooth 100. With reference to FIGS. 3-5, the interproximal reduction tool and method preferably includes at least one polishing strip 10; at least one abrasive wheel 12; and a low speed and high torque dental electric motor 14. First, the area between two adjacent teeth 100, 102 is manually polished with the thinnest polishing strip 10. A preferred polishing strip is sold under the name of Qwik Strips. The polishing strips come in increasing values of thickness. The polishing strips have single sided grit and come in yellow, red, blue, green and black. Each polishing strip 10 includes a polishing member 16 and a holder 18. The polishing strip 10 is held between a forefinger and thumb and moved in a horizontal plane, until a 0.09 mm space is created between the two adjacent teeth 100, 102. However, other types of dental polishing strips may also be used.

With reference to FIGS. 3-4, each abrasive wheel 12 preferably includes an abrasive disc 20 and a shaft 22. The abrasive disc 20 is mounted to one end of the shaft 22. The abrasive wheel 20 includes a disc base 24 and abrasive material 26. An annular shape of abrasive material 26 is preferably formed on opposing sides of the disc base 24. It is preferable to have an annular space 28 between an outer edge of the abrasive disc 20 and an outer perimeter of the annular band of abrasive material to prevent gouging to the two adjacent teeth 100, 102. It is preferable to have a second annular space 29 without abrasive between an inside perimeter of the abrasive material and the shaft 22. The second annular space 29 prevents accidental destruction of the adjacent tooth.

The following dimensions are given by of example and not by way of limitation. A width "A" of the annual abrasive material 26 has a preferable value of about 2.5 mm, but other values could also be used. A width "B" of the annular space 28 has a preferable value of between 0.5 mm-1.0 mm, but other valves could also be used. An outer diameter "C" of the annular abrasive material 26 has a preferable valve of about 21 mm, but other values could also be used. A thickness of the abrasive material 26 on the disc base 24 preferably has the values of yellow (0.15 mm), red (0.20 mm), blue (0.30 mm), green (0.4 mm) and black (0.50 mm). It is preferable that the grit of the abrasive material be sourced from Strauss Diamond.

Figure 6:
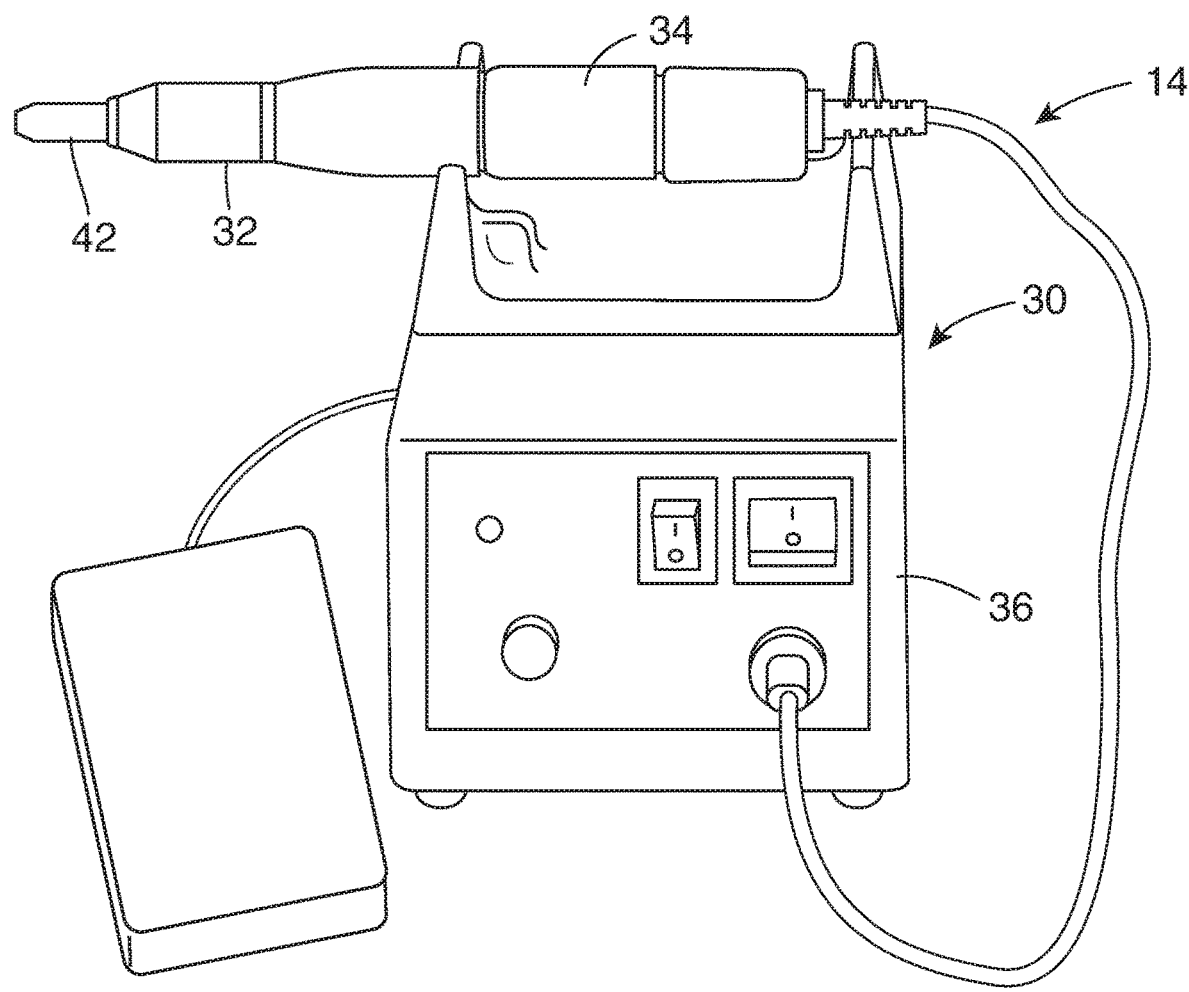
FIG. 6 is a perspective view of a dental motor that has been modified with a 16:1 gear reduction drive of an interproximal reduction tool and method in accordance with the present invention.

With reference to FIGS. 5-6, the low speed/high torque motor 14 preferably utilizes an existing dental motor 30 and modifies the dental motor 30 with a preferable gear reduction drive 32 of 16:1 to reduce speed by 1/16 and increase torque 16 times. The dental motor 30 is preferably a Marathon III micro motor, but other dental motors could also be used. The dental motor 30 includes a motor handpiece 34 and a speed control unit 36. A spindle 38 extends from the motor handpiece 34 for retaining a shaft 22 of the abrasive wheel 12 or the like. The gear reduction drive 32 includes a spindle receiving end 40, collar portion 41 and an spindle output end 42. The gear reduction drive 32 results in a slower rotation of the abrasive disc 20 to provide extreme precision; improved tactile control to the dentist; and prevents the abrasive wheel 12 from getting caught between the two adjacent teeth 100, 102. However, an abrasive wheel 20 could be secured to the spindle 38. The speed control unit 36 preferably includes variable speed and a top speed of 35,000 rpm and 280 gf·cm of torque.

Figure 7:
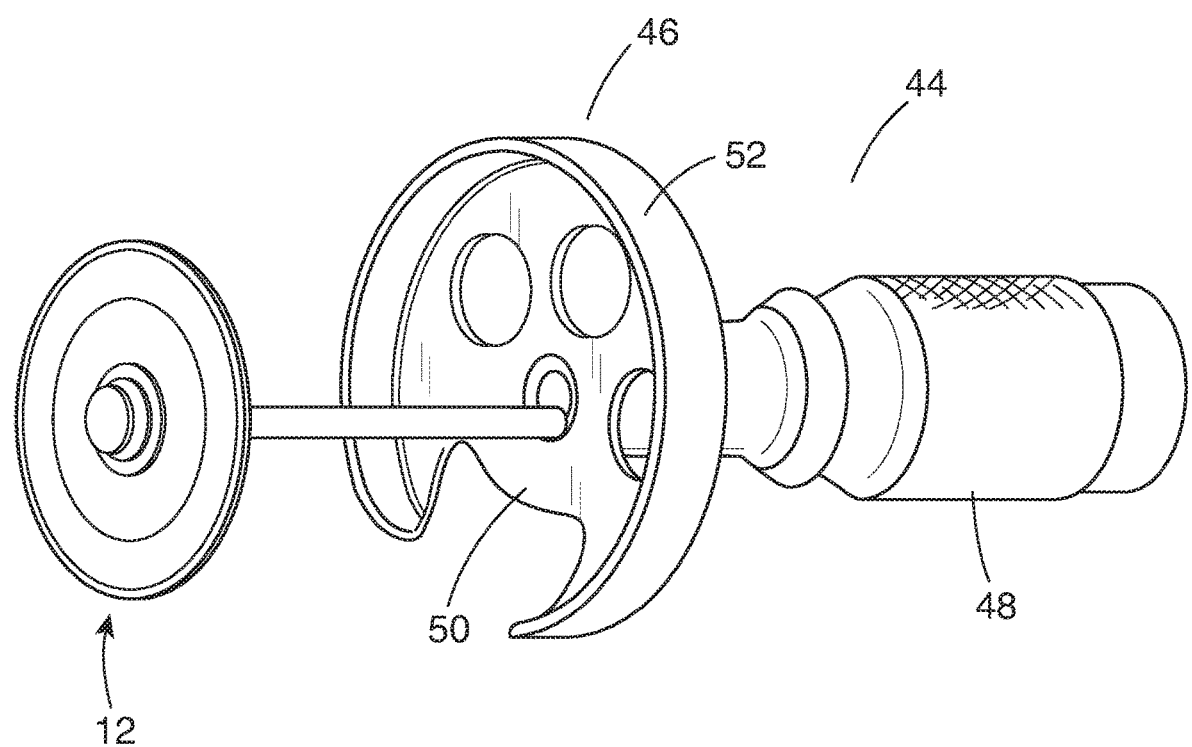
FIG. 7 is a partially perspective view of a shaft of an abrasive wheel retained in a lip guard of an interproximal reduction tool and method in accordance with the present invention.

With reference to FIGS. 2 and 7, a lip guard 44 is shown, which protects a human lip 104 when the abrasive wheel 12 is being used between two adjacent teeth 100, 102. The lip guard 44 preferably includes a disc guard 46 and a collar receiver portion 48. The collar receiver 48 extends from a rear of the disc guard 46. A shaft bore 50 is formed through a center of the disc guard 46 and the collar receiver portion 48 to receive the shaft 22 of the abrasive wheel 12. The disc guard 46 includes a base portion 50 and a flange portion 52. The flange portion 52 extends from an outer perimeter of the base portion 50. The collar receiver 48 includes a collar bore (not shown), which is sized to firmly receive the collar portion 41 of the gear reduction drive 32.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. An interproximal reduction method comprising the steps of:
   a. moving at least two abrasive strips, each having a thickness, in a sequence between two adjacent teeth;
   b. moving at least two abrasive wheels, each having a thickness, in a sequence between the two adjacent teeth, each wheel comprising:
      i. a disc base;
      ii. an annular band of abrasive material on at least one side of the disc base;
      iii. a first annular space between an outer edge of the disc base and an outer perimeter of the annular band of abrasive material; and
      iv. a second annular space between an inner perimeter of the annular band of abrasive material and a shaft;
   increasing the interproximal space between the two adjacent teeth;
   wherein the moving the at least two abrasive wheels comprises rotating the wheels by mounting the wheels to an electric dental motor
   wherein the first annular space has a width less than the width of the second annular space; and
   wherein the first annular space and the second annular space are not abrasive material.

2. The interproximal reduction method of claim 1, wherein each sequence comprises from a first thickness to one or more greater thickness.

3. The interproximal reduction method of claim 1, wherein the at least two abrasive wheels comprise a thickness of from about 0.09 mm to about 0.50 mm.

4. The interproximal reduction method of claim 1, wherein the annular band of abrasive material is on two opposing sides of the disc base.

5. The interproximal reduction method of claim 1, wherein the annular abrasive material comprises a width of about 2.5 mm.

6. The interproximal reduction method of claim 1, wherein the first annular space comprises a width of about 0.5 mm to about 1.0 mm.

7. The interproximal reduction method of claim 1, wherein the second annular space has a width greater than the width of the annular band of abrasive material.

8. The interproximal reduction method of claim 1, wherein the electric dental motor comprises a gear reduction drive for reducing the speed of the motor by 1/16 and increasing the torque 16 times.

9. The interproximal reduction method of claim 1, wherein the interproximal space between the two adjacent teeth comprises about 0.09 mm to about 0.50 mm.

10. The interproximal reduction method of claim 1, wherein the mounting comprises inserting the shaft of the at least two abrasive wheels through a lip guard into the electric dental motor.

11. The interproximal reduction method of claim 10, wherein the lip guard comprises a lip collar.

\* \* \* \* \*